J. Macy,
Upsetting Tires.
№ 77,297.  Patented Apr. 28, 1868.
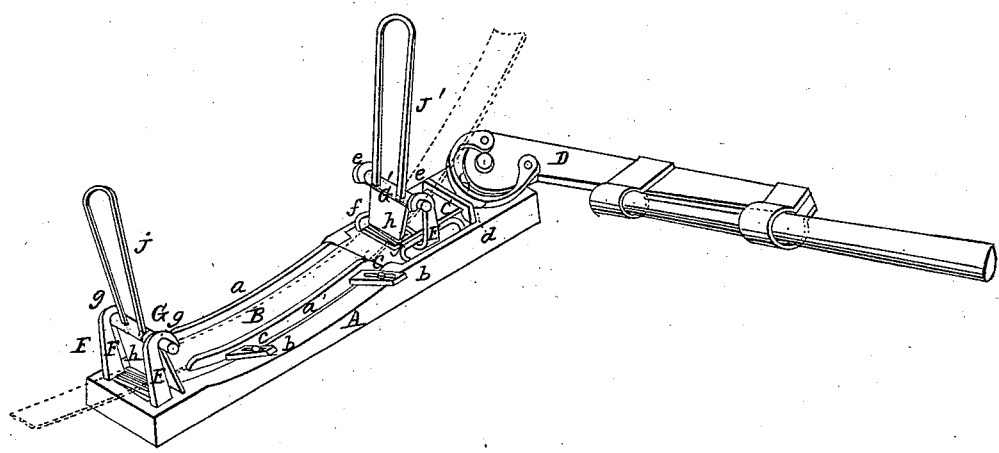
Witnesses:
W. C. Ashkettle
Inventor:
John Macy
per Munn & Co
Attorneys

United States Patent Office.

JOHN MACY, OF PINE, OREGON.

Letters Patent No. 77,297, dated April 28, 1868.

IMPROVED TIRE-SHRINKER.

*The Schedule referred to in these Letters Patent and making part of the same.*

TO ALL WHOM IT MAY CONCERN:

Be it known that I, JOHN MACY, of Pine, in the county of Linn, and State of Oregon, have made and invented a new and useful Improvement in Tire-Shrinkers; and I do hereby declare that the following is a full, clear, and exact description thereof, which will enable those skilled in the art to make and use the same, reference being had to the accompanying drawing, and to the letters of reference marked thereon.

This invention relates to a new and improved device for shrinking tires; and it consists in the employment or use of a fixed bed, provided with a fixed and an adjustable flange, in connection with a fixed and an adjustable clamp, all arranged to operate as hereinafter set forth, whereby tires of different widths may be contracted or shrunk with the greatest facility, and in a perfect manner.

The accompanying drawing is a perspective view of my invention.

A represents a rectangular stock, in which a metallic bed, B, is firmly secured, said bed having a longitudinal concave upper surface, with a fixed flange, $a$, at one side, and an adjustable flange, $a'$, at the opposite side, the flange $a'$ being provided with slotted arms $b$, through which bolts $c$ pass into the stock, and admit of it being adjusted nearer to or further from the flange $a$, to suit the width of the tire to be operated upon.

C represents a sliding plate on the stock A, which is operated by a cam-lever, D, plainly shown in the drawing. This plate C is fitted in a guide, $d$, and is provided at each side with an upright, E, the upper ends of said uprights being curved or bent to form hooks $e$. These uprights E extend up through guides $ff$ on the stock A.

F F represent two uprights, similar to E E, having hooks $g\,g$ on their upper ends. The uprights F F are fixed, being driven in or otherwise secured to the stock.

G G' are two clamps, composed of a plate, $h$, having their upper ends fitted in shafts $i$, the ends of which are placed under the hooks $e\,g$ of the uprights E E, F F, loops or handles $j$ being fitted in the shaft.

The operation is as follows:

The plate C is drawn back from the bed B, and the clamps G G' removed. The tire, properly heated, as shown in red, is placed (its heated portion) on the bed B, and the flange $a'$ adjusted so that the heated portion of the tire will fit snugly between the two flanges $a\,a'$. The clamps G G' are then adjusted in position, the lower edges of the plate $h$ bearing upon the tire, and the sliding plate C, by actuating the cam-lever D, is moved towards the bed B, the clamps firmly clutching the tire, and the latter between the clamps is consequently compressed or upset.

Having thus described my invention, I claim as new, and desire to secure by Letters Patent—

The fixed bed B, provided with the fixed and adjustable clamps $a\,a'$, in combination with the sliding plate C, actuated by the cam-lever D, and the clamps G G' fitted to the uprights E E, F F, when all said parts constructed and arranged in the manner substantially as and for the purpose set forth.

JOHN MACY.

Witnesses:
 IRWIN MACY,
 JAMES WATKINS.